(12) United States Patent
Kumar et al.

(10) Patent No.: US 12,175,625 B2
(45) Date of Patent: Dec. 24, 2024

(54) COMPUTING DEVICE DISPLAYING IMAGE CONVERSION POSSIBILITY INFORMATION

(71) Applicant: Microsoft Technology Licensing, LLC, Redmond, WA (US)

(72) Inventors: Santosh Kumar, Jaipur (IN); Raunak Pandya, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 392 days.

(21) Appl. No.: 17/456,864

(22) Filed: Nov. 29, 2021

(65) Prior Publication Data

US 2023/0169625 A1 Jun. 1, 2023

(51) Int. Cl.
*G06T 3/40* (2024.01)
*G06T 3/4038* (2024.01)
*G06T 7/70* (2017.01)

(52) U.S. Cl.
CPC .............. *G06T 3/4038* (2013.01); *G06T 7/70* (2017.01); *G06T 2207/20092* (2013.01)

(58) Field of Classification Search
CPC ..................... G06T 3/4038; G06T 7/70; G06T 2207/20092
See application file for complete search history.

(56) References Cited

U.S. PATENT DOCUMENTS

| | | |
|---|---|---|
| 2014/0285486 A1 | 9/2014 | Chang et al. |
| 2015/0009359 A1* | 1/2015 | Zaheer .................. H04N 5/265 348/239 |
| 2015/0054913 A1 | 2/2015 | Annau et al. |
| 2015/0215532 A1 | 7/2015 | Jafarzadeh et al. |
| 2015/0249815 A1 | 9/2015 | Sandrew et al. |
| 2021/0142463 A1 | 5/2021 | Amirghodsi et al. |

FOREIGN PATENT DOCUMENTS

WO WO 2013/166066 * 11/2013 ............. G06F 15/16

OTHER PUBLICATIONS

"PTGui—Create High Quality Panoramas", Retrieved from: https://web.archive.org/web/20210914160618/https://www.ptgui.com/, Sep. 14, 2021, 10 Pages.

Adelson, Ted, "Lines, Shading, and the Perception of 3D Shape", Retrieved from: https://www.microsoft.com/en-us/research/video/lines-shading-and-the-perception-of-3d-shape/, Aug. 1, 2012, 3 Pages.

(Continued)

*Primary Examiner* — David F Dunphy
(74) *Attorney, Agent, or Firm* — Newport IP, LLC; Jacob P. Rohwer

(57) ABSTRACT

A computing device is provided, including a storage device configured to store image data and a processor coupled to a memory that stores instructions, which, upon execution by the processor, cause the processor to select a target image from the image data. The processor is further configured to display conversion possibility information that indicates that the target image can be converted into a larger image that has a larger field of view by stitching other images together with at least a portion of the target image and an associated selector. The processor is further configured to display the larger image upon receiving a user selection of the selector.

19 Claims, 13 Drawing Sheets

(56) References Cited

OTHER PUBLICATIONS

Akbarzadeh, et al., "Towards Urban 3D Reconstruction from Video", In Proceedings of the 3rd International Symposium on 3D Data Processing, Visualization and Transmission, Jun. 14, 2006, 8 Pages.

Audu, et al., "Virtual Viewpoint Three-Dimensional Panorama", In International Journal of Computer Science, Engineering and Information Technology, vol. 4, Issue 6, Dec. 2014, pp. 9-25.

Halim, et al., "View Synthesis by Image Mapping and Interpolation", In Proceedings of the Pan-Sydney Area Workshop on Visual Information Processing, vol. 11, May 1, 2001, 6 Pages.

Hassner, et al., "Example Based 3D Reconstruction from Single 2D Images", In Proceedings of Conference on Computer Vision and Pattern Recognition Workshop, Jun. 17, 2006, 8 Pages.

Koser, et al., "Dense 3D Reconstruction of Symmetric Scenes from a Single Image", In Joint Pattern Recognition Symposium, Aug. 31, 2011, 10 Pages.

Shum, et al., "Stereo Reconstruction from Multiperspective Panoramas", In IEEE Transactions on Pattern Analysis and Machine Intelligence, vol. 26, Issue 1, Dec. 2003, 8 Pages.

Fitzgibbon, et al., "Automatic 3D Model Acquisition and Generation of New Images from Video Sequences", In Proceedings of European Signal Processing Conference, Jul. 1998, 8 Pages.

Xu, et al., "Deep 3D Portrait from a Single Image", In Proceedings of IEEE/CVF Conference on Computer Vision and Pattern Recognition, Jun. 2020, 16 Pages.

Wu, et al., "Repetition-based Dense Single-View Reconstruction", In Proceedings of the 24th IEEE Conference on Computer Vision and Pattern Recognition, Jun. 20, 2011, pp. 3113-3120.

Pollefeys, et al., "Detailed Real-Time Urban 3D Reconstruction from Video", In International Journal of Computer Vision, vol. 78, Issue 2, Jul. 2008, 25 Pages.

Shesh, et al., "3D-aware Image Editing for Out of Bounds Photography", In Journal of Graphics Interface, Jan. 2009, 8 Pages.

Sinha, et al., "Detecting and Reconstructing 3D Mirror Symmetric Objects", In Proceedings of the 12th European Conference on Computer Vision, Oct. 7, 2012, 14 Pages.

Steedly, Drew, "Large-scale 3D Reconstruction from Video", Retrieved from: https://www.microsoft.com/en-us/research/video/large-scale-3d-reconstruction-from-video/, Apr. 27, 2004, 3 Pages.

Vincent, James, "Make a 3D Model of Your Face from a Single Photo with This AI Tool", Retrieved from: https://www.theverge.com/2017/9/18/16327906/3d-model-face-photograph-ai-machine-learning, Sep. 18, 2017, 7 Pages.

"Image Stitching", Retrieved from: https://courses.engr.illinois.edu/cs498dwh/fa2010/lectures/Lecture%2017%20-%20Photo%20Stitching.pdf, Retrieved Date: Aug. 25, 2021, 69 Pages.

"International Search Report and Written Opinion Issued in PCT Application No. PCT/US22/042285", Mailed Date: Dec. 9, 2022, 9 Pages.

* cited by examiner

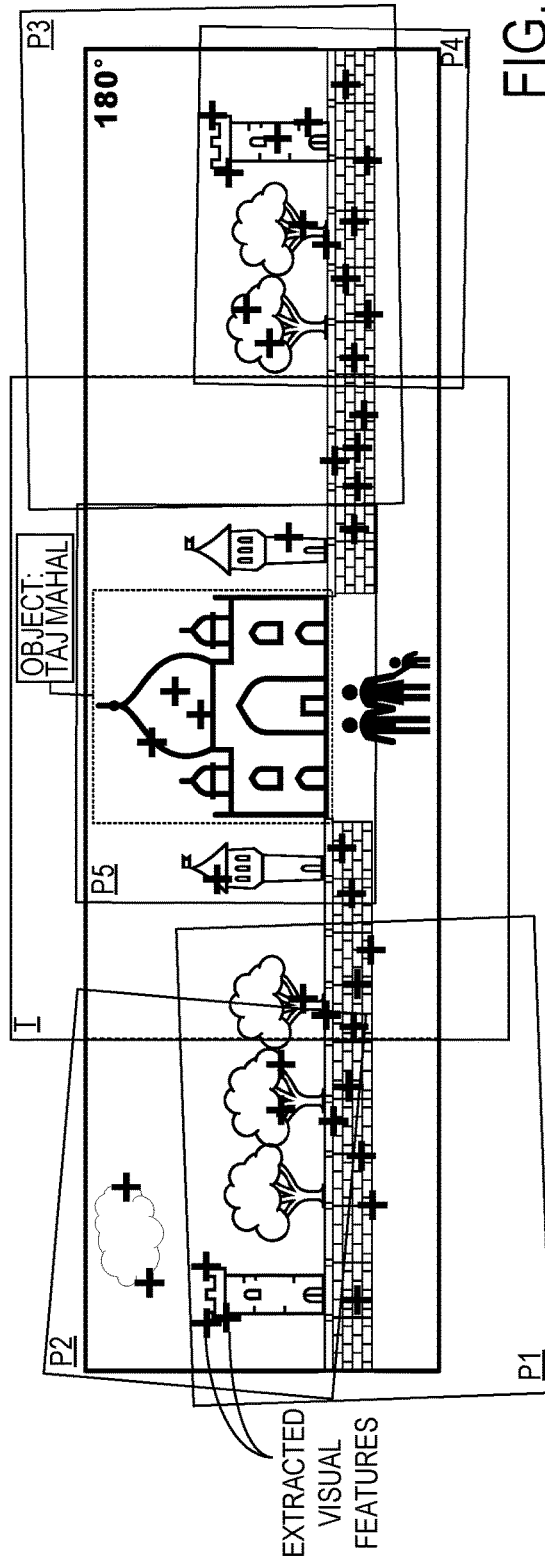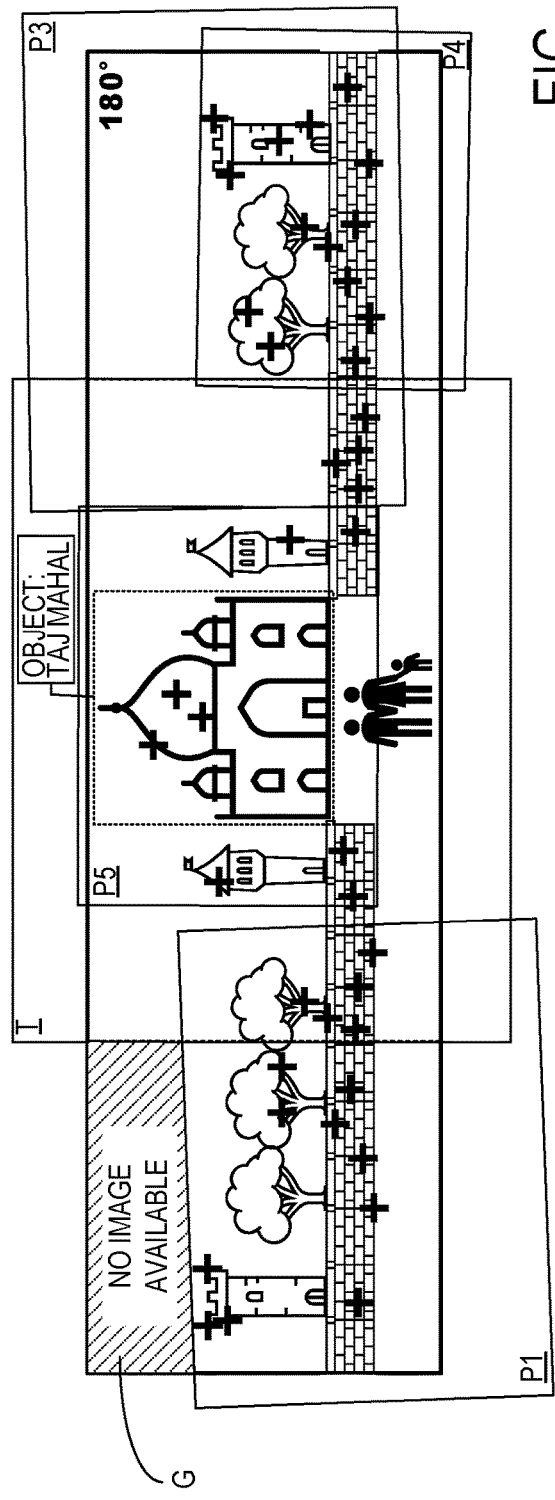

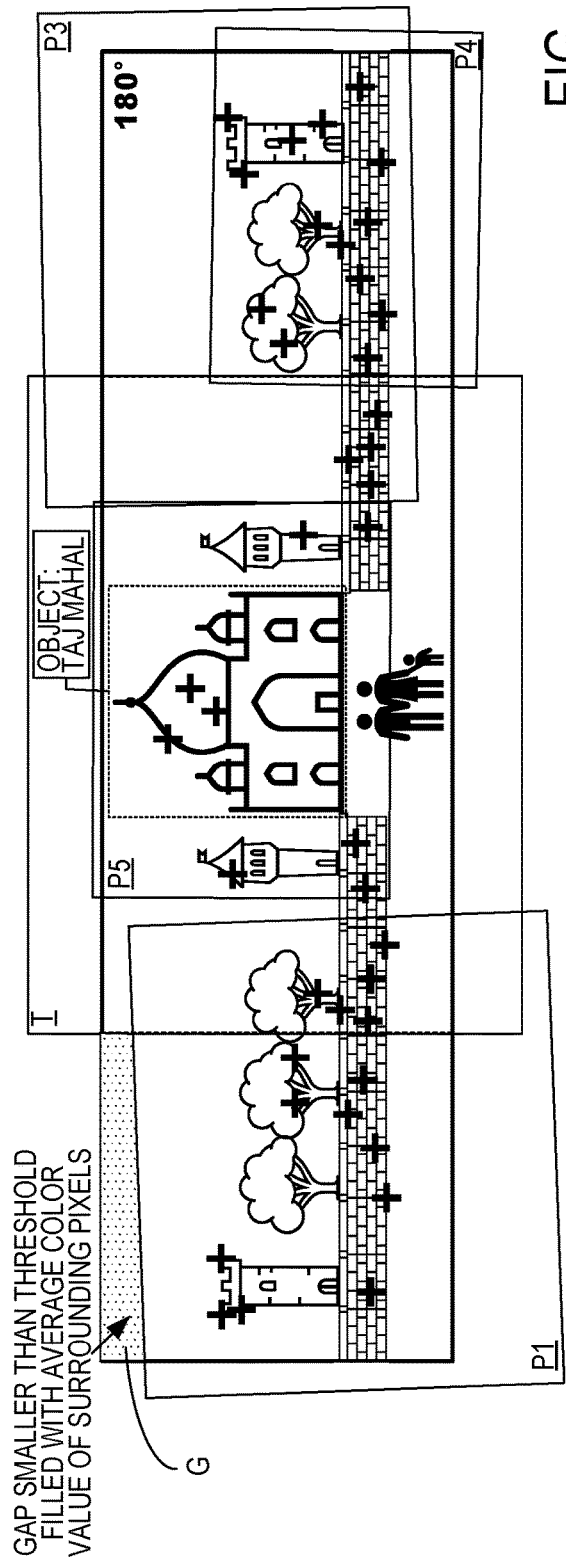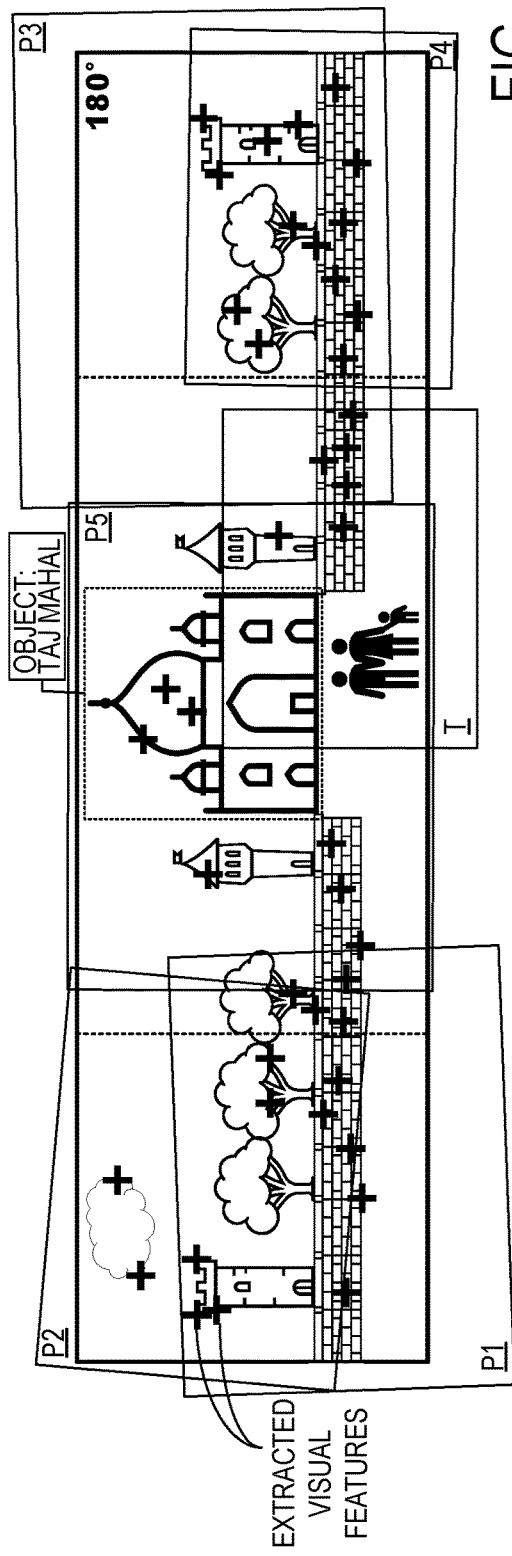

COMPUTING DEVICE DISPLAYING IMAGE CONVERSION POSSIBILITY INFORMATION

BACKGROUND

Various image stitching techniques and algorithms have been developed in recent years. Image stitching is the process of combining multiple photographic images with overlapping fields of view to produce a larger image such as a spherical image or panoramic image. With such image stitching techniques, a larger image can be created by stitching together multiple two-dimensional images of a scene taken substantially simultaneously from a two-dimensional camera. Since the images have slightly different fields of view of a scene and include visual features present in the scene that are shared between the images, the stitching algorithms can match the shared visual features and assemble a larger composite image that reproduces a larger field of view of the scene than exhibited in any one of the individual images.

SUMMARY

A computing device and method are provided. The computing device includes a storage device configured to store image data and a processor coupled to a memory that stores instructions, which, upon execution by the processor, cause the processor to select a target image from the image data. The processor is further configured to display conversion possibility information that indicates that the target image can be converted into a larger image that has a larger field of view by stitching other images together with at least a portion of the target image and an associated selector. The processor is further configured to convert the target image into the larger image upon receiving a user selection of the selector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A-4E show schematic views of example GUIs of the computing system of FIG. 1, featuring other images within a threshold distance of the target image in the map of FIG. 3 overlayed on the target image to determine whether conversion of the target image to a larger image is possible.

DETAILED DESCRIPTION

As briefly discussed above, photo stitching tools and services can be used to create larger images such as spherical and panoramic images by stitching together multiple pictures taken at the same time in the same geographic location. One such photo-stitching tool enables a user to upload various images captured at one time to a server, which stitches the images together to form a larger image. However, a drawback with such an approach is that the user needs to be in possession of sufficient two-dimensional images in order to create the larger image, which is not always the case. If the user wants to guarantee the user's ability to use such a tool, the user must plan ahead and ensure that the user captured sufficient images to later create the larger image. It can be inconvenient and time consuming for the user to prepare all images necessary for creating the larger images in this manner.

To address this issue, a computing device is disclosed herein that is configured to display conversion possibility information that indicates whether a target image can be converted into a larger image with a larger field of view by stitching together other images available to the platform with at least a portion of the target image. The conversion possibility information enables a user to foresee if the target image selected by the user can be converted to the larger image before attempting to do so. This is beneficial since it allows a user to know whether there are sufficient images available to stitch the user's individual image into the larger image, as not all of a user's individual images will be able to be converted to the larger image. For instance, a larger image may not be able to be created for a particular target image when there are not enough surrounding images available in the associated image store or when the location of user's individual image is not identifiable.

Figure 1:
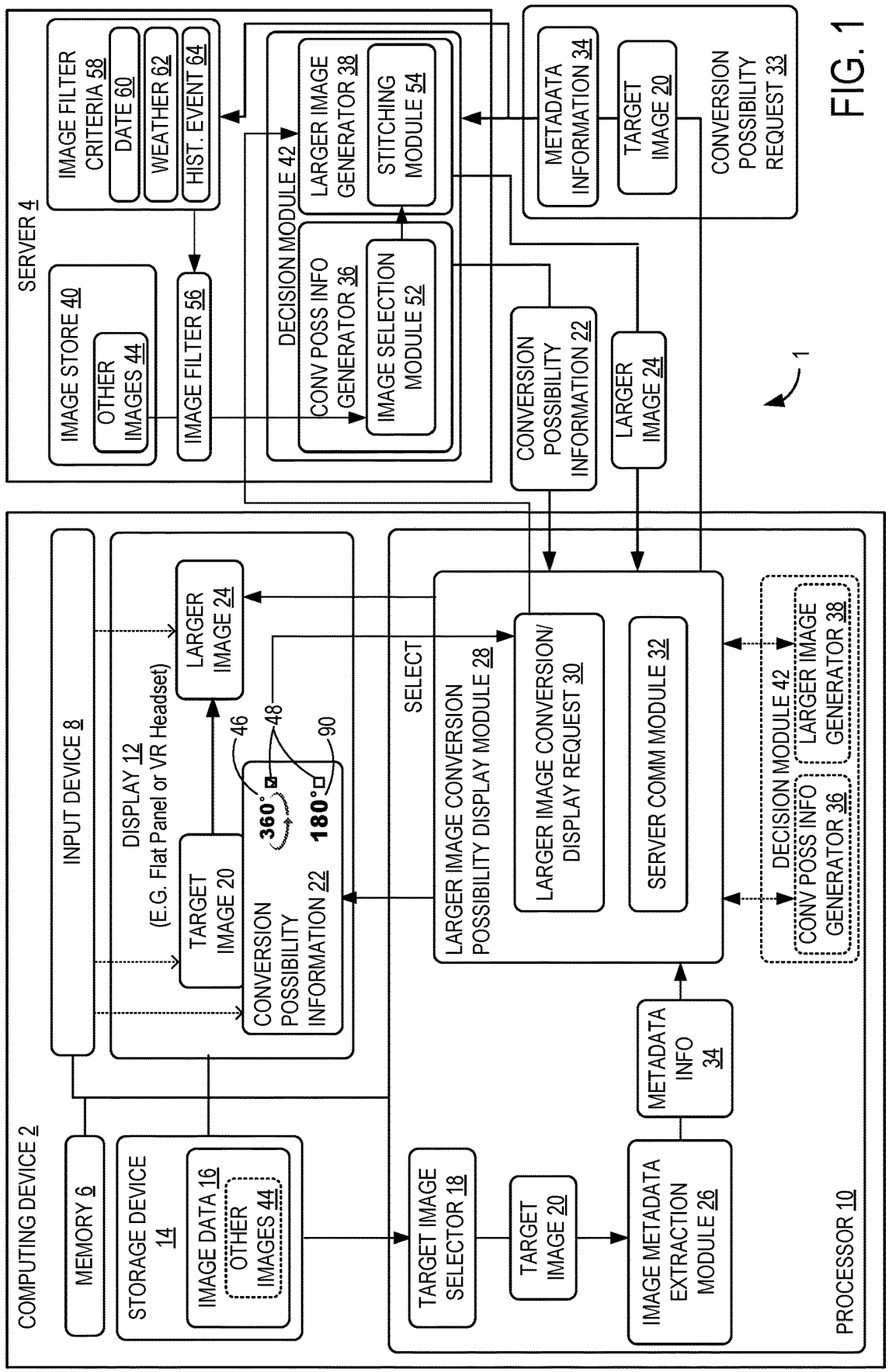
FIG. 1 shows a schematic view of a computing system including a computing device configured to display conversion possibility information that indicates that the target image can be converted into a larger image and a server configured to generate the conversion possibility information and larger image, according to one example implementation of the present disclosure.

FIG. 1 shows a schematic view of a computing system 1, which includes a computing device 2 configured to display conversion possibility information 22 that indicates that a target image 20 can be converted into a larger image 24, as well as a server 4 configured to generate the conversion possibility information 22 and the larger image 24, according to one example implementation of the present disclosure. Computing device 2 may be any of a variety of types of computing devices that are portable and include an integrated camera, such as a smartphone, tablet computing device, digital camera, and head mounted display device. Such a portable device equipped with a camera may be carried by a user to various locations and used to capture images at the location. Alternatively, computing device 2 may be not include an integrated camera and/or may not be portable. For example, computing device 2 may be a laptop, desktop, or server computer device. Such devices may be used by a user to view stored images taken at another location.

In the depicted configuration, the computing device 2 includes a processor 10, memory 6, and storage device 14, which may be operatively coupled to each other by a communications bus. The processor 10, memory 6, and storage device 14 may each be configured as one or more physical components such as one or more processor cores and/or one or more physical memory modules. The storage device 14 stores image data 16 such as digital photos and videos that are taken via a smartphone, tablet computing device, head mounted display device, or digital camera, downloaded from the web, or shared from other users, for example. Thus, it will be appreciated that the image data 16 includes the target image 20 as well as other images 44.

The computing device 2 may further include an input device 8, which may be a keyboard, a mouse, a touchscreen, a trackpad, an accelerometer, a microphone, a camera, or some other suitable type of input device. In addition, the computing device 2 may further include a display 12 such as a flat panel display, or virtual reality (VR) headset display configured to display images.

To begin, to obtain the conversion possibility information 22 a target image 20 is selected via a target image selector 18 of the processor 10 upon a user's selection. Alternatively, the processor 10 may be configured to programmatically or automatically select a target image 20 via the target image selector 18 that is suitable for creating a larger image, without the user's selection. For instance, target image 20 may be programmatically or automatically selected via the target image selector 18 based on its location, time, object, and user's preference. As some specific examples, one such target image 20 may be a photo taken at a sightseeing destination or historical building, which the user desires to convert into a larger image 24 such as a spherical image or panoramic image. In another example, user may select a region of interest within an existing image to create the target image 20, such as a bounding box around an object, person, and or scene person of interest. For example, a user may select a region of interest 23 to include a specific object such as a building or tower within the selected image, and region of interest may be extracted to form the target image 20, as shown in FIG. 2F below. This allows the user to select only portions of an image that are of interest, and to exclude unnecessary or undesired content from the target image 20, such as a building under construction, an unrelated person, undesirable portions of the scene, etc.

Figure 3:
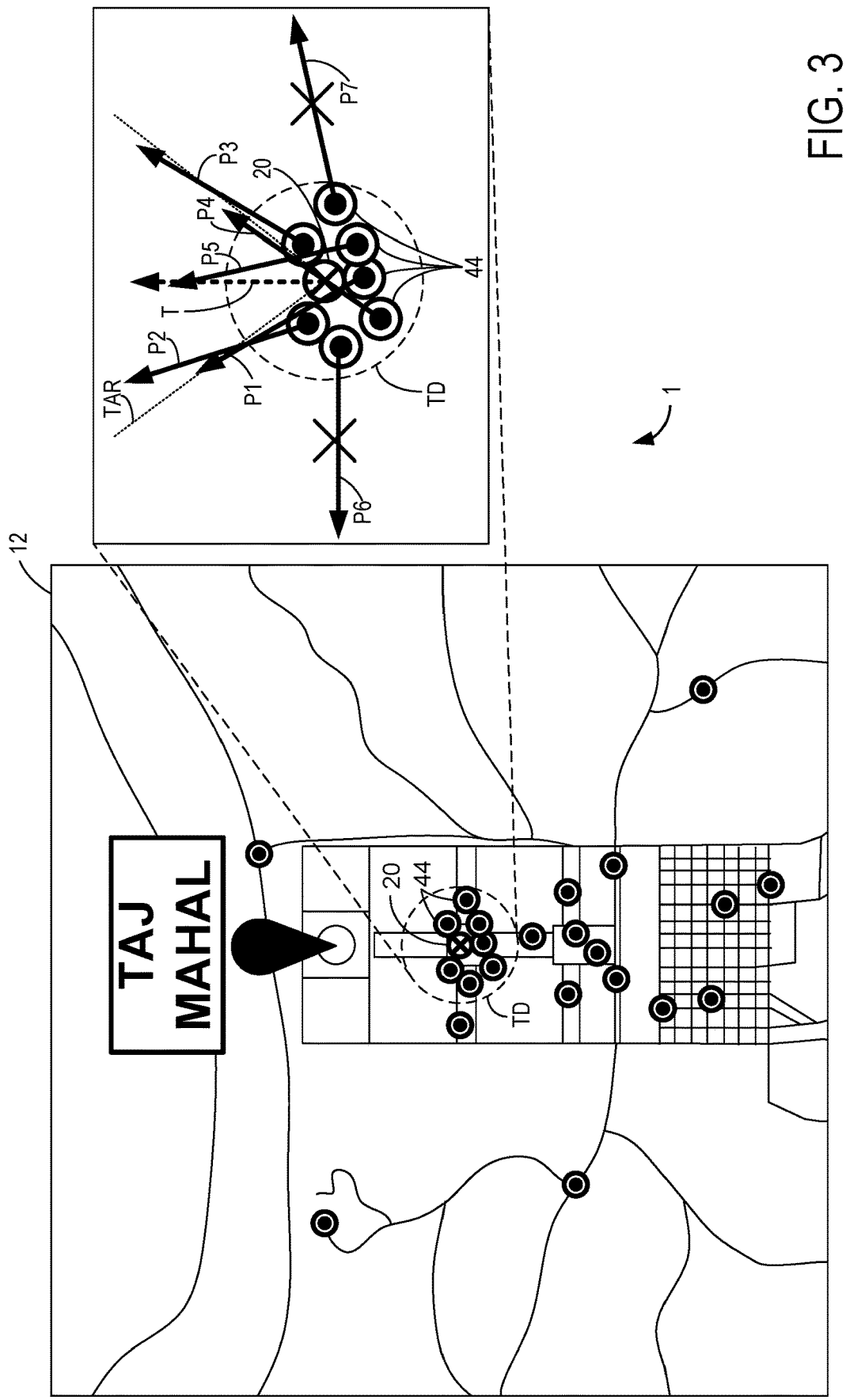
FIG. 3 is a schematic diagram of a map of a target image and other images displayed in an example GUI on a display of with the computing system of FIG. 1.

The selected target image 20 is provided to an image metadata extraction module 26 of the processor 10 to extract metadata information 34 of the target image 20. The metadata information 34 may include location (GPS) and date and time information where the target image 20 was taken. In addition to GPS information the metadata information may include compass information indicating the orientation of the camera relative to true north at the time the image was taken. To this end, it will be appreciated that the computing device may include an inertial measurement unit (IMU) that includes both accelerometers and a magnetic compass configured to produce the compass information, and the IMU may be configured to output a six degree of freedom (6DOF) pose vector that indicates the position and orientation in world space of the computing device. Alternatively, instead of an IMU, a magnetic compass may provide a compass bearing that is included in metadata information 34. From this pose vector or compass bearing, the field of view of the camera in world space may be estimated. The metadata information may further include place names associated with the detected GPS coordinates associated with the location at which the image was taken. Image filtering based on compass bearing is illustrated in FIG. 3 and described below.

The metadata information 34 may further include object information of the target image 20. The object information may be obtained by running object recognition algorithms on the target image 20. For example, the object recognition algorithms may be configured to identify well-known architecture, monuments, fountains, statues, paintings, or other works of art and include their names, locations, or other identifying information as the object information, as some examples. For example, the algorithms may be trained to recognize the Taj Mahal, White House, Washington Monument, Brandenburg Gate, Mona Lisa painting or various other well-known attractions around the world. An example object tag on a target image 20 indicated that the Taj Mahal was recognized in the target image is illustrated in FIGS. 4A and 4B. In this example, the object information may include the name of the object and the location of the object in world space. The object information may also include image segmentation information that identifies the locations of recognized objects in the target image, for example a bounding box surrounding a region of interest containing the object, as illustrated in dashed lines in FIGS. 4A and 4B.

The metadata information 34 may further include feature information of the target image 20 such as RGB (red, green, and blue) values of the image organized into a histogram, i.e., a binned representation of the tonal values of the image. This can help match the target image 20 with other images 44 with similar color profiles.

The metadata information may further include extracted visual features such as so-called scale-invariant feature transform (SIFT) features extracted by the SIFT algorithm, binary robust independent elementary features (BRIEF) extracted by the BRIEF algorithm, gradients binned in a histogram by the histogram of oriented gradient algorithm (HoG), etc. Example extracted visual features are illustrated in FIGS. 4A and 4B.

Returning to FIG. 1, at least a portion of the extracted metadata information 34 of the target image 20 may be transmitted to a server 4 via a server communication module 32 of a larger image conversion possibility display module 28 for the purpose of obtaining conversion possibility information 22 that indicates that the target image 20 can be converted into a larger image 24 that has a larger field of view by stitching other images 44 together with at least a portion of the target image 20, if conversion is determined to be possible by the server. The system 1 may determine that two images are stitchable if there is sufficient correspondence between the extracted visual features in each image, and the color histogram of each image. The system 1 determines whether one or more other images 44 can be stitched in this manner to cover the entire field of view of the potential larger image 24, as shown in FIG. 4A. If even one gap of more than a threshold size is present in the stitched images within the field of view of the larger image, as shown in FIG. 4B, then the system 1 determines that conversion to the candidate image larger size is not possible. The threshold size maybe set to a few (e.g., 1-10 pixels), for example. The gaps may be in-painted with color values obtained by averaging the color values of surrounding pixels, for example, as shown FIG. 4C, discussed below. Alternatively, no gaps may be permitted in the larger images.

Returning to FIG. 1, the particular size and format of the larger image 24 should be understood not to be limited. For example, the larger image 24 may be a spherical image, 270-degree panoramic image, or a 180-degree panoramic image. Alternatively, a larger image 24 of another size or projection type may be generated. For example, the larger image 24 may further be a three-dimensional image or a 360-degree three-dimensional image.

In one example use case scenario, other images 44 may include surrounding images associated with the target image 20 that were taken at different times and uploaded by different users to the server 4. In one particular example, a user may input a desired time range for matching other images, and the target image 20 and metadata information 34 including the desired time range for the other images 44 may be transmitted to the server 4 to obtain the conversion possibility information 22, which is computed by the server as described below.

Although the examples discussed thus far have referred to the other images 44 as being stored at the server 4, it should be appreciated that in other examples configurations, the other images 44 may be stored on the computing device 2 and the conversion possibility information 22 may be computed at the computing device 2, using the components shown in FIG. 1 in dashed lines, as further discussed below.

In addition or as an alternative to sending the metadata information 34 from the computing device 2 to the server 4, the target image 20 itself may be sent from the computing device 2 to the server 4, particularly in situations where the additional bandwidth consumed by sending the target image 20 is not undesirable. In this configuration, the target image 20 may be used by the conversion possibility information generator 36. For example, in such an alternative configuration, the image metadata extraction module 26, may alternatively be located on the server 4, and the conversion possibility information generator 36 may use metadata information 34 that was extracted from the target image 20 at the server 4.

Continuing with the depicted embodiment of FIG. 1, once the request for conversion possibility information is sent from the computing device 2 to the server 4, the server 4 receives the request along with accompanying metadata information 34 of the target image, and/or, in some configurations, the target image 20 from the computing device 2. Based on this information, a conversion possibility information generator 36 of the server 4 searches a collection of other images 44 stored in an image store 40. As used herein, an image store refers to a collection of images stored on one or more storage devices, such as a hard disk drive (HDD) or solid-state drive (SSD). The collection of images may be gathered from various image sources, including public image aggregation sites on the Internet, other platform users who upload photographs, etc. Thus, image store 40 may store a large amount of image data including photos and videos of various locations captured and uploaded by various users around the globe. While typically the image store 40 is accessible from and may be collocated with server 4, in an alternative configuration described below, it will be appreciated that the image store may be on the computing device, as described below.

An image selection module 52 of the conversion possibility information generator 36 selects images from the image store 40 to analyze the possibility of creating the larger image 24 for the target image 20. The image store 40 is searched to determine a potential match with the target image 20. The image selection module 52 utilizes various techniques for the image selection. For example, the image selection module 52 may perform image selection by searching for matching images in a location matching phase and a content matching phase. During the location matching phase, GPS coordinates, camera pose information, and/or location place name information may be used to identify other images 44 that were captured within the vicinity of the target image 20. During the content matching phase, the content of the other images 44 is compared to the target image 20, for example, by comparing object tags applied to each image by objection recognition algorithms, feature vectors containing multiple extracted visual features from each image, etc.

To illustrate these phases, FIG. 3 shows an example map of a target image 20 and other images 44 taken in a region of Agra, India near the Taj Mahal. The location matching phase searches for other images 44 that were taken within a threshold distance TD of the target image 20. The threshold distance TD from the target image 20 location is represented as a dashed circle in FIG. 3. Images captured from locations within the threshold distance TD are initially selected in the location matching phase. The threshold distance may be a specific value, such as 10 feet, or may be a relative value, such as $\frac{1}{10}^{th}$ of the distance to a recognized object in the target image 20, such as the Taj Mahal in FIG. 3. In addition, where known, the location matching phase can also involve filtering out images that were not taken from a similar orientation as the target image. In FIG. 3, images taken within the threshold distance TD of the target image 20 location are further compared to determine whether they are within a target angular range TAR relative to the orientation of capture of the target image 20. In one embodiment, the target angular range TAR is 60 degrees, i.e., 30 degrees positively or negatively differing from the camera pose (compass bearing orientation) illustrated by the vector at T for the target image 20. Alternatively, a rage of 90 degrees or 30 degrees may be used. In the illustrated example, two of the images, P6 and P7, do not fall within the target angular range TAR and are eliminated from consideration for stitching together with the target image as a result, as indicated by the X through pose vectors for images P6 and P7. The remaining images, P1 through P5, are selected for stitching with the target image 20, as shown in FIG. 4A and discussed below.

The content matching phase may involve searching for images with the same recognized object or objects as contained in the target image 20. For example, in FIGS. 4A and 4B, the recognized object TAJ MAHAL has been surrounded by a boundary box (indicated in dashed lines) and tagged with the semantic tag TAJ MAHAL. Thus, when searching for other images 44 during the content matching phase, other images 44 containing the same tag TAJ MAHAL that was applied by object recognition algorithms can be matched to the target image 20 containing the same tag.

In addition or alternatively, the content matching phase may search for a similar visual feature set as contained in the target image. The visual feature sets of the target image 20 and other images 44 may be identified using algorithms such as SIFT, BRIEF, or HoG, discussed above, on each image. A template matching approach may also be used, according to which a similarity measure for two images is computed based on a sum square difference or cross correlation between the images, for example. FIGS. 4A and 4B schematically illustrate the sets of extracted visual features as plus signs sprinkled throughout the various constituent images. Positional correspondence between these features sets is used by the image selection module 52 to select candidate other images 44 for stitching together with target image 20.

Once a set of candidate matching images from other images 44 are identified via the techniques described above, the conversion possibility information generator 36 determines whether a larger image 24 can be created for the target image 20 by determining whether the candidate matching images can be stitched together with the target image to achieve a field of view as large as the larger image 24. In some embodiments, a plurality of larger image sizes may be evaluated in parallel. Based on these computations, the conversion possibility information generator 36 generates the conversion possibility information 22, and transmits the conversion possibility information 22 to the computing device 2. In the example of FIG. 4A, the conversion possibility information generator 36 determines that conversion to the 180 degree larger image format is possible, since the entire area within the boundary of the 180 degree larger image format is covered by stitched images. However, in the example illustrated in FIG. 4B, no image such as P2 is available in the image store that can fill the gap region G within the boundary of the 180 degree larger image format, and thus the conversion possibility information generator 36 determines conversion to the 180 degree larger image format is not possible. It will be noted that gap region G is larger than a predetermined value of pixels that define a permissible gap, such as 1-10 pixels.

Returning to FIG. 1, the larger image conversion possibility display module 28 of the computing device 2 receives the conversion possibility information 22 from the server 4 and displays the conversion possibility information 22 and an associated selector 48 on the display 12. As described in detail below, the conversion possibility information 22 may be displayed as an icon 46 (e.g., 360-degree icon) or text 90 (e.g., 180-degree) over the target image 20 that indicates one or more available options for image conversion. A respective selector 48 is provided for each available option, as shown. A user can select a specific conversion type from the available options for image conversion and send a request for the larger image 24 with the conversion type using the associated selector 48, via the input device 8. In the case that the images available to create a larger image 24 for the target image 20 are insufficient and no conversion is possible, as was the case for the example of FIG. 4B discussed above, the icon for the conversion possibility information 22 may not be displayed, or may be displayed with a visual indication of unavailability, such as an X marked through the icon.

Once the user initiates a larger image request 30 to convert the target image 20 into the larger image 24 by selecting one of the available conversion options of the conversion possibility information 22 via selector 48, the larger image request 30 for the larger image 24 is sent from the computing device 2 to the server 4. This larger image request 30 is received by the larger image generator 38 at the server 4, which generates the larger image 24 using the matching other images 44.

To generate the larger image 24, a stitching module 54 of the larger image generator 38 is configured to use the positional correspondence of the extracted visual feature sets of the matching other images 44 and target image 20, discussed above, to overlay, orient, scale, and position the other images 44 with the target image 20, so that they may be stitched together to form the larger image 24. Although the larger image 24 is described above as being generated by the stitching module 54 only after the larger image request 30 is received from the computing device 2, it will be appreciated that the stitching module 54 may be configured to stitch the larger image 24 together earlier when the availability for conversion to a larger image is being evaluated to avoid redundant processing, and store the larger image 24 at the server 4 for future download to the computing device 2 upon receiving larger image request 30.

In some embodiments, depth information may be encoded in the target image 20 and/or other images 44. The depth information may be obtained from a depth camera at the time of image capture, or may be ascertained using stereoscopic depth determination techniques by comparing images captured from adjacent locations in time and space. In such embodiments, the stitching module 54 of the larger image generator 38 performs the stitching in three-dimensional space, such that the resultant larger image 24 is a three-dimensional image. In one example, the large image generator 38 may integrate such depth information into the larger image 24 to generate a three-dimensional 360-degree larger image that can be viewed via a VR headset.

Once the larger image 24 is generated, server 4 transmits the generated larger image 24 back to the computing device 2. The computing device 2 receives the larger image 24 from the server 4 and displays the larger image 24 on the display 12 via the larger image conversion possibility display module 28 of the processor 10. Alternatively or in addition, the larger image 24 may be transmitted from the computing device 2 to another computing device for display. For example, the computing device 2 may transmit the larger image to an external VR headset for 3D display.

In an alternative embodiment, the computing device 2 may perform the functions executed by the server 4 above, namely, generating the conversion possibility information 22 and larger image 24. To this end, as shown in dashed lines in FIG. 1, the computing device 2 may implement a decision module 42 that includes the conversion possibility information generator 36 and larger image generator 38 in the computing device 2 as shown in FIG. 1. With this configuration, the metadata information 34 and the target image 20 are not required to be transmitted to the server 4. In this configuration, the conversion possibility information 22, which indicates whether the target image 20 can be converted into the larger image 24 by stitching other images 44 stored in the storage device 14 of the computing device 2 together with at least a portion of the target image 20, may be generated based on the target image 20 and/or metadata information 34 of the target image by a decision module 42 executed by the processor 10 of the computing device 2. In addition, the target image 20 may be converted into the larger image 24 by the larger image generator 38 executed by the processor 10.

It will be appreciated that the computing system 1 may be configured with various functional modules, which utilize the methods for determining whether a larger image conversion possibility exists described above, to provide a new image interaction experience to the user. For example, the computing system 1 may be configured to enable a user to view the larger image 24 that has been formed of selected other images 44 to achieve a particular look, feel, or effect, or to feature particular content. As three particular examples in this vein, the server 4 may further include image filter criteria 58 and an image filter 56 that preselects other images 44 according to the image filter criteria 58 selected from the group consisting of date 60, weather 62, and historical events 64, allowing a user to personalize the larger image 24 to a particular time period, weather type, or event. Since a large volume of other images 44 are stored in the image store 40, multiple images for the same location may be stored as candidate images for the larger image 24 and selected based on their characteristics. Alternatively, the candidate images may be preselected (i.e., filtered) by date 60 such that a user can select the year the photo was taken. The candidate images may also be preselected (i.e., filtered) by weather 62 such that a user can select the weather (e.g., sunny or rainy) in which the photo was taken. The weather information may be (1) tagged in the other images 44 based on weather data available for the location and date of the image, (2) classified from image data of the other images 44 using a neural network that has been trained to recognize weather conditions, or (3) matched between the target image 20 and other images 44 by a neural network that has been trained to match atmospheric, lighting, and terrain conditions between images. The candidate images may also be preselected (i.e., filtered) by historical events 64 such that a user can select a historical event at which the photo was taken. A user can check to see if these options are available via the conversion possibility information 22 on the computing device 2 and select one of the options, as described in relation to the example of FIG. 2E below. One example scenario that illustrates all of these filters is that a user who has taken a picture of themselves at the Lincoln Memorial in Washington D.C. might specify to create a larger image 24 from images of the historical event of the famous March on Washington that occurred at the Lincoln Memorial in 1963 in cloudy weather. If sufficient images are available in the image store 40, the larger image generator 38 will generate a larger image 24 that surrounds the target image 20 of the user with historical imagery from other images 44 taken of that event in the specified weather conditions, as shown in FIG. 4E.

Figure 4E:
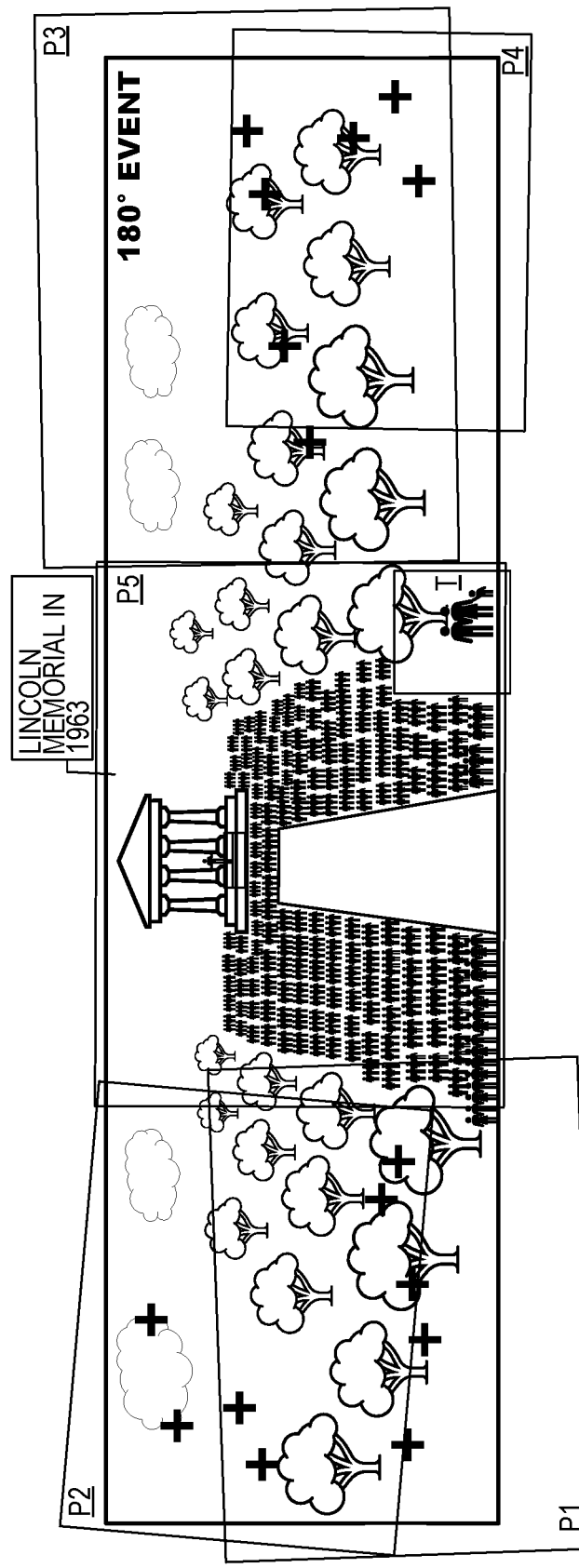

FIG. 4E depicts a larger image formed form other images 44 that were taken at the Lincoln Memorial on Aug. 28, 1963, within the vicinity of the user's target image 20 and with an orientation toward the front of the Lincoln Memorial. The other images 44 used to form the larger image 24 in this example all depict the scene at the famous "I Have A Dream" speech by Martin Luther King on Aug. 28, 1963, while the target image 20 depicts members of the user's family in the same location in the present day. This larger image 24 was generated in response to the user selecting a target image 20 of the user's family at the Lincoln Memorial, and then selecting as event criteria that other images 44 be filtered by the "I Have A Dream Speech" event via a pop-up window 110C such as shown in shown in FIG. 2E, and viewing conversion possibility information 22 indicating that a larger image 24 could be created for the target image 20 based on the selected event, and selecting the CONVERT selector of FIG. 2E.

Figure 2A:
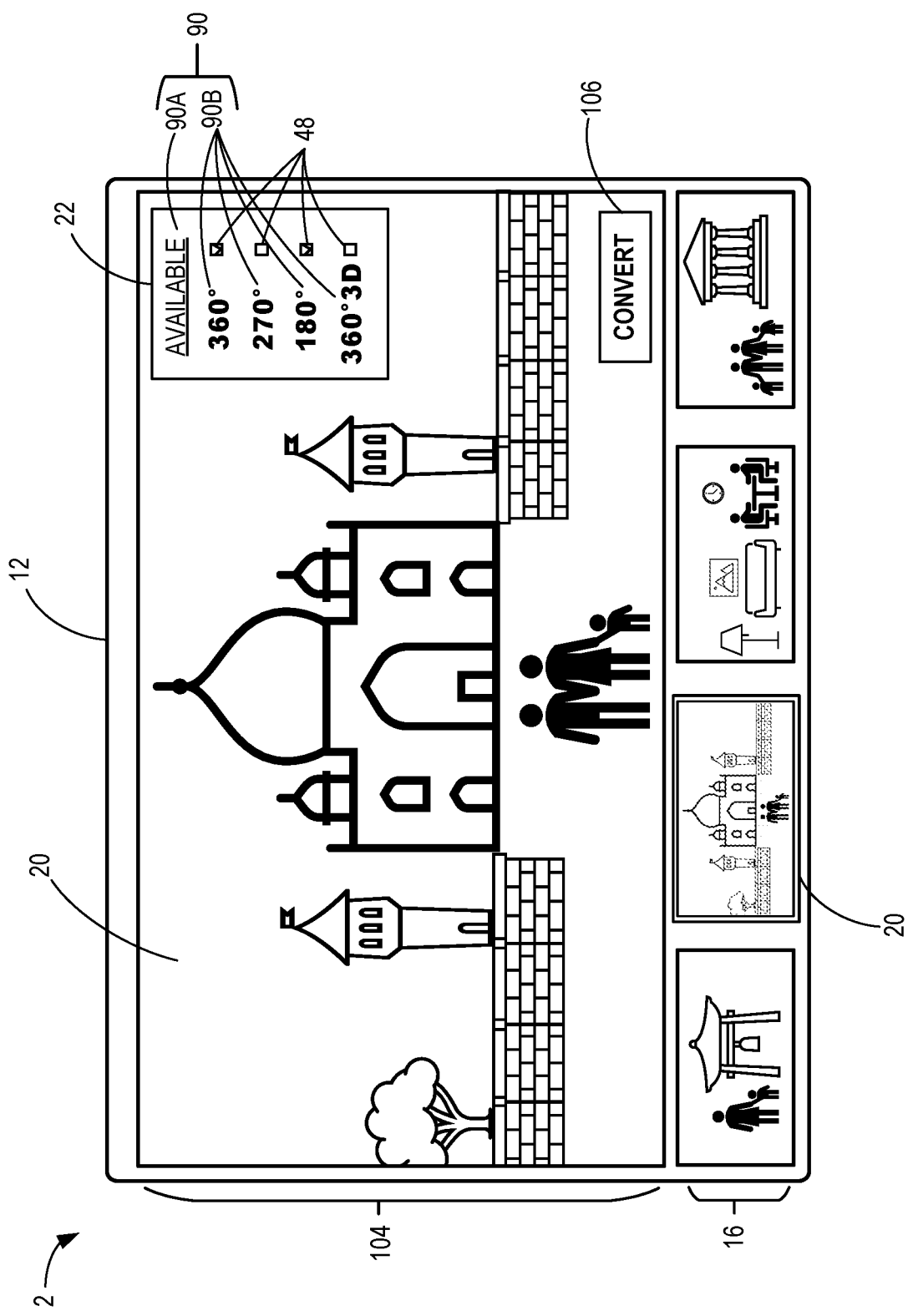
FIGS. 2A-2F show a schematic view of an example graphical user interface (GUI) displaying conversion possibility information adjacent a target image and region of interest selected by a user using the computing system of FIG. 1.
Figure 2B:
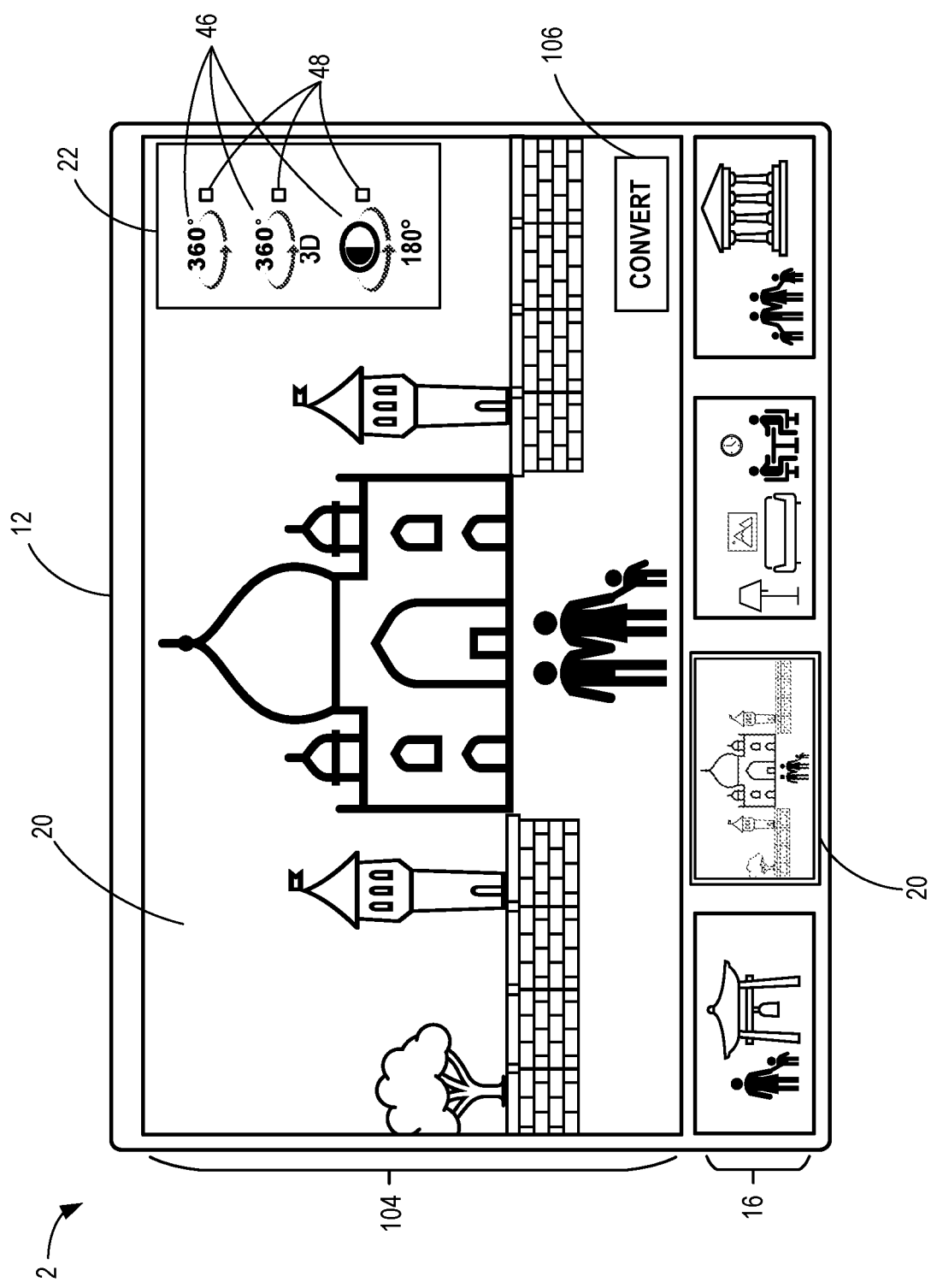
Figure 2C:
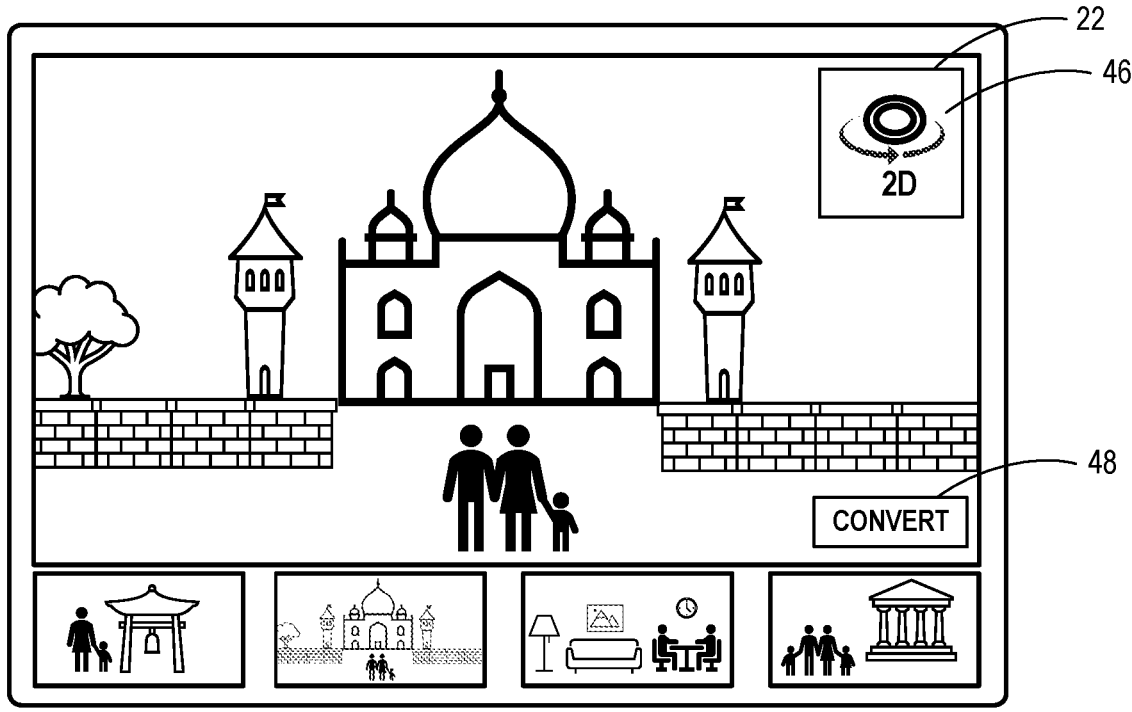
Figure 2D:
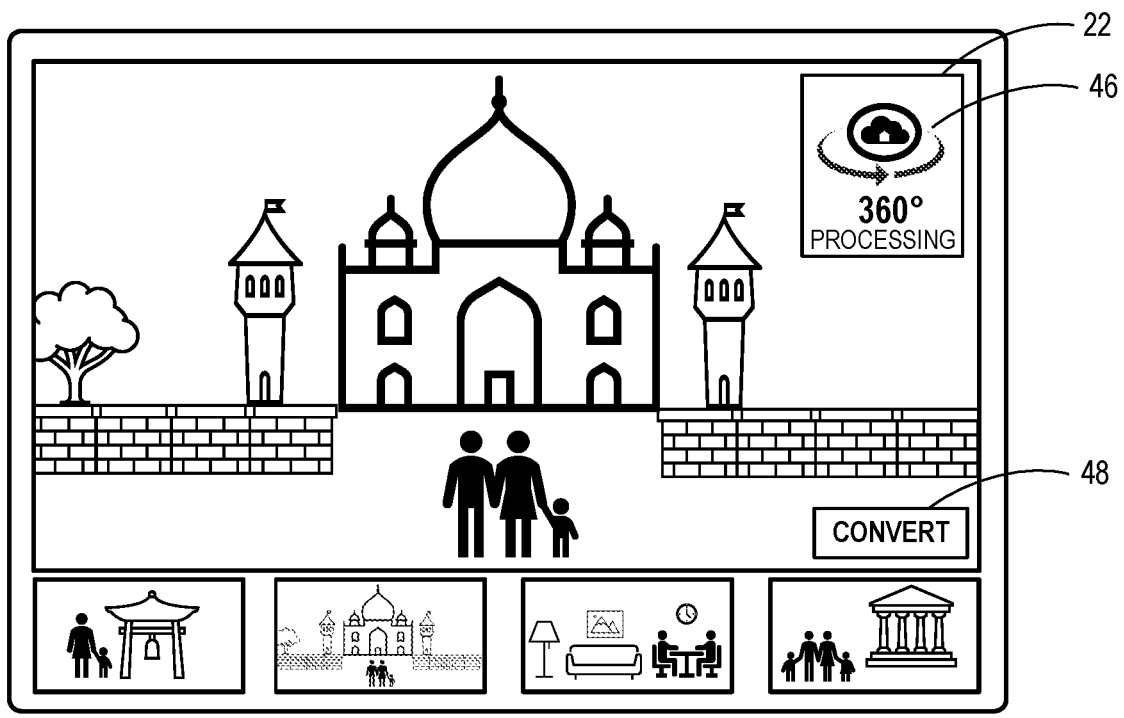
Figure 2E:
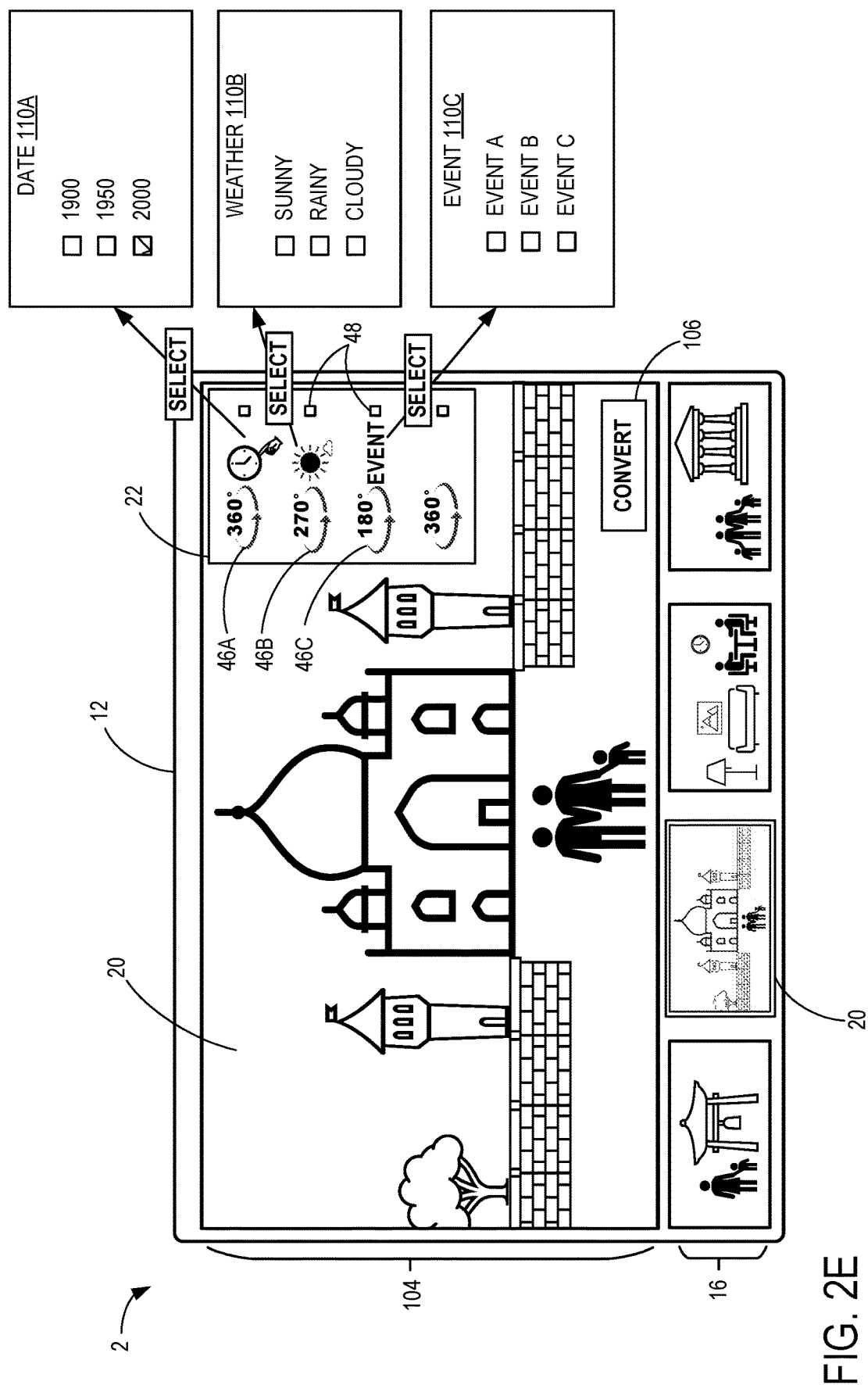
Figure 2F:
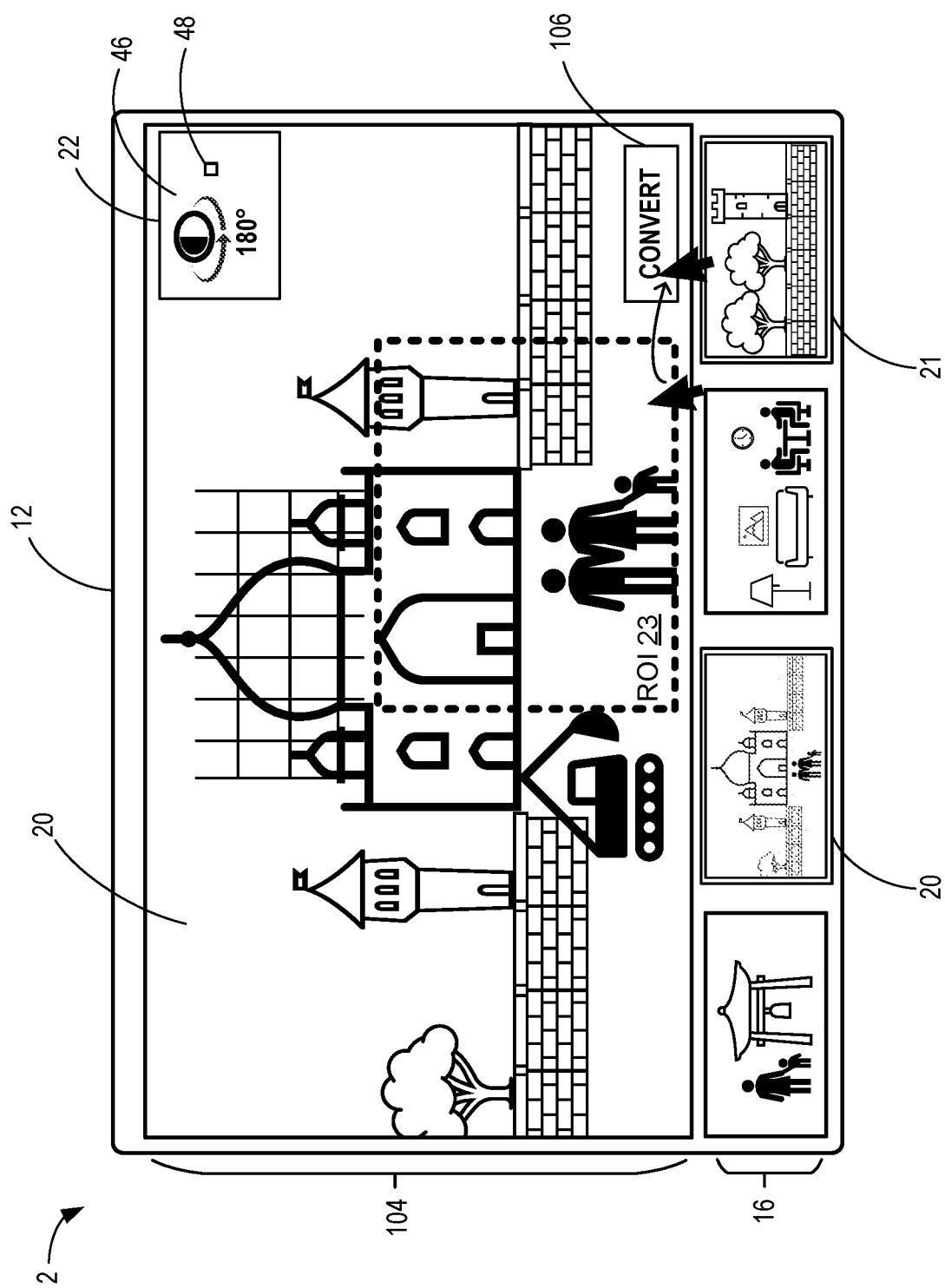

FIGS. 2A-2F show a schematic view of an example GUI displaying the conversion possibility information 22 over the target image 20 selected by a user using the computing device 2 of FIG. 1. The target image 20 may be selected by a user or the processor 10 from the image data 16, which can be displayed as image thumbnails on the display 12 of the computing device 2. The selected target image 20 may be displayed on a main screen 104 of the display 12. The conversion possibility information 22 displayed over the target image 20 may indicate available conversion options such as 360-degree image, 270-degree image, 180-degree image, and 360-degree 3D image. The conversion possibility information 22 may be displayed as text 90, and may include a general availability indicator 90A and a plurality of conversion options 90B, as shown in FIG. 2A. A user may select the desired conversion option 90B from among the available conversion options 90B via the corresponding selector 48. The selectors 48 are depicted as multi-select checkboxes of which one or more may be selected, but may take any suitable alternative form. The user may further request conversion to the selected conversion options 90B by selecting the conversion selector 106 displayed adjacent the target image 20. Once the larger image request 30 is made, the larger image request 30 may be transmitted to the server 4, or alternatively to the decision module 42 of the computing device 2, to be converted into a larger image 24 by the large image generator 38.

Turning to FIG. 2B, the conversion possibility information 22 may also be displayed as a conversion indicator icon 46 with or without any text as shown in FIG. 2B. In this example, the icons 46 for the conversion possibility information 22 indicate that 360-degree image, 360-degree 3D image, and 180-degree image conversions are available. A user may select the desired conversion option via the selector 48.

As depicted in FIG. 2C, the conversion possibility information 22 may include image conversion status information. The icon 46 for the conversion possibility information 22 as shown in FIG. 2C indicates that a conversion of the target image 20 to a larger 360-degree image is possible and the conversion request has not been made yet.

Turning to FIG. 2D, the icon 46 for the conversion possibility information 22 may indicate that a conversion request for an available conversion of the target image 20 to a larger 360-degree image has been made and the conversion is in process. This is indicated in FIG. 2D both by the cloud with up-arrow icon, and also by the PROCESSING label positioned below the icon.

Turning to FIG. 2E, the conversion possibility information 22 indicating that the target image 20 may be able to be converted to a larger image 24 using other images 44 from a specific date, weather and/or historical event may be displayed with icons 46A, 46B, and 46C, of which the user may select using the selector 48 to request a conversion. When the user selects one of the icons 46A, 46B, or 46C, a popup window 110A, 110B, or 110C may be displayed for further selection of criteria to derive a more personalized larger image 24 for the target image 20. For instance, the user may select the year (e.g., 1900, 1950, or 2000) in which the image was taken, as shown in 110A. The user may also select the weather (e.g., sunny, rainy, or cloudy) in which the image was taken in as shown in 110B. Further, the user may select a historical event during which the image was taken as shown in 110C. Events may be matched by matching the selected historical event to event tags that have been labeled on the other images 44 by human curators or trained artificial intelligence models. Once the user selects one of the options using the selector 48 and clicks the convert button 106, a request for the larger image 24 conversion with the selected image filter criteria 58 for other images 44 may be transmitted to the server 4, and the personalized larger image 24 may be generated with the requested image effect or feature.

Turning to FIG. 2F, the conversion possibility information 22 may indicate that a region of interest 23 within the target image 20 selected by a user may be able to be converted to a larger image 24. For example, a user may select a region of interest 23 to include a specific object such as a building or people within the selected image and to exclude part of a building which is under construction, and the region of interest 23 may be extracted to form the target image 20, i.e., upon selection the region of interest 23 becomes the target image 20 itself. Thus, upon receiving a user selection of the selector, the system is configured to convert the modified target image 20, which has been cropped to the region of interest 23, into the larger image 24. The resulting larger image 24 includes the region of interest 23 and excludes the remainder of the original, uncropped target image 20, which in this example means that it excludes the part of a building which is under construction, as illustrated by the tractor in FIG. 4D.

Furthermore, a plurality of the target images 20, 21 taken at the same location may be selected by a user or the processor 10 from the image data 16, which can be displayed as image thumbnails 16 on the display 12 of the computing device 2. Upon selection of a plurality of the images 20, 21, Metadata information 34 of the selected plurality of the target images 20, 21 may be extracted and transmitted to the server 4. The conversion possibility information 22 indicating that the plurality of the target images 20, 21 may be converted to the larger image 24 may be obtained from the server by the computing device as a result.

Figure 5A:
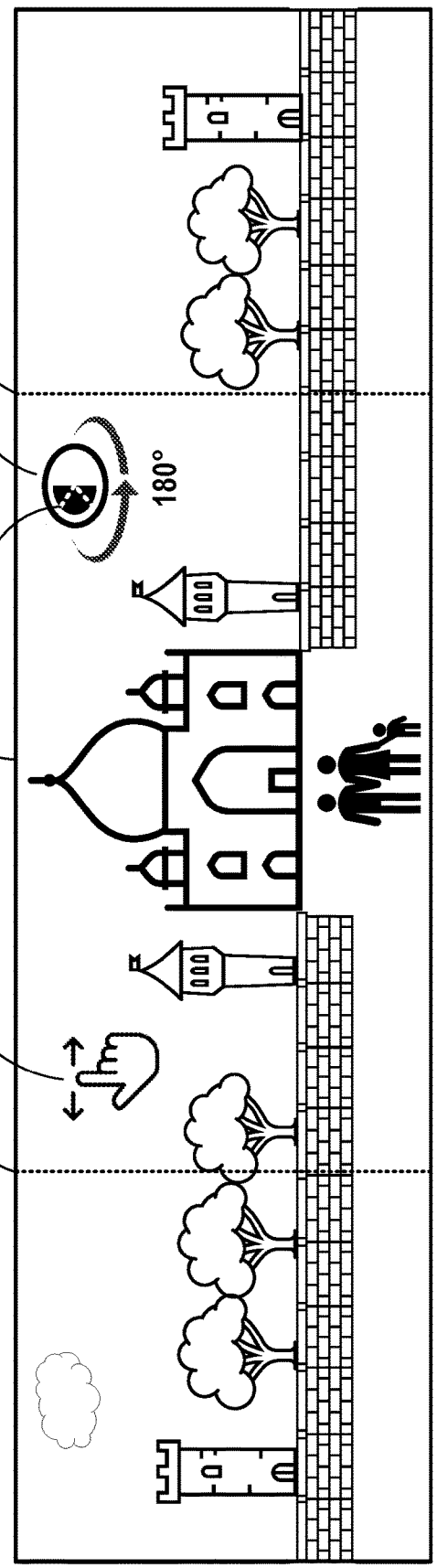
FIGS. 5A-5B show a schematic view of an example GUI displaying a larger image converted from a target image using the computing system of FIG. 1.
Figure 5B:
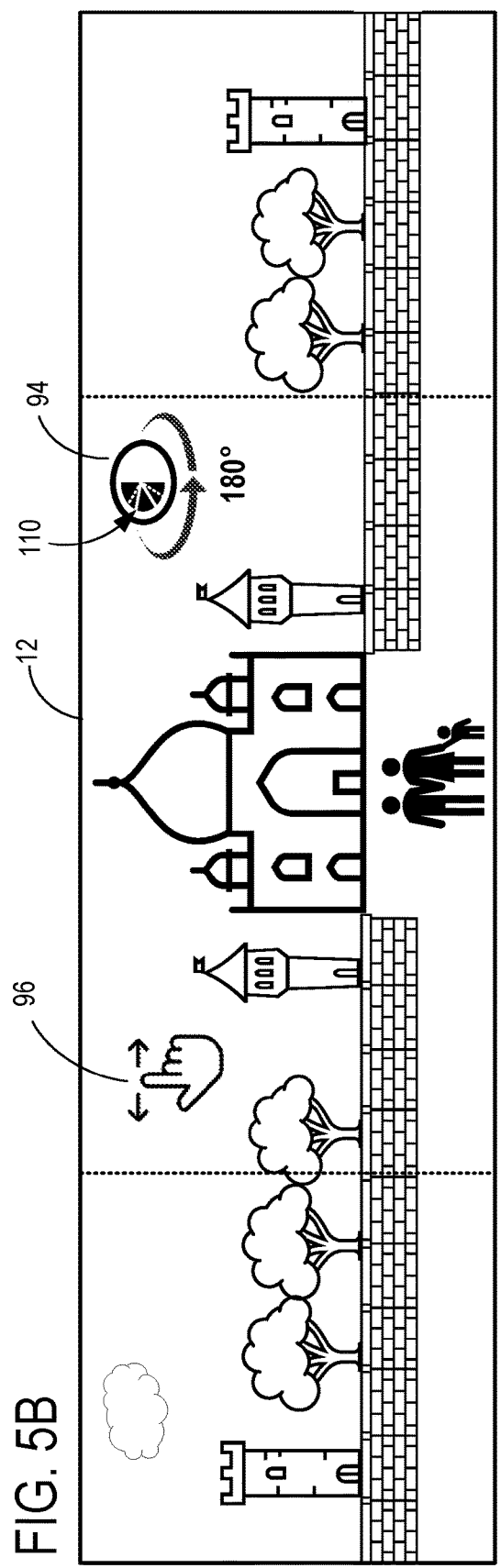

FIGS. 5A-5B show a schematic view of an example GUI displaying an example of the larger image 24 converted from the target image 20 using the computing device 2 of FIG. 1. As discussed above, upon the user's request, the target image 20 is converted into the larger image 24 by the server 4 or the decision module 42 integrated into the computing device 2, and displayed on a display 12 of the computing device 2 as shown in FIG. 5A. An element of original image navigation information 94 indicating that the target image 20 has been converted into the larger image 24 may be displayed over the larger image 24. As part of the original image navigation information 94, the larger image 24 may be displayed with a visual differentiator 100 that visually differentiates the target image 20 and other stitched images in the larger image 24, as shown in FIG. 5A. The visual differentiator 100 may be integrated into the original image navigation information 94 with an icon that includes an original image region and a region of the other images that were stitched together with the original image to create the larger image 24. The icon may change orientation as the user pans the larger image via an image slider 96 to indicate whether a displayed portion of the larger image is the original image or the other stitched images. Alternatively, the visual differentiator 100 may be a dashed line, a shaded region, or a highlighted region superimposed on the larger image 24. Tuning to FIG. 5B, the icon of the original image navigation information 94 may indicate the user's current view of the larger image 24 with the "V" shaped marker 110. The marker 110 may change orientation as the user pans the larger image via an image slider 96.

As described above, the target image 20 intended to be converted into the larger image 24 may be selected by the user or automatically selected by the processor 10 of the computing system 2 and displayed on the GUI. The conversion possibility information 46, indicating whether there are sufficient other images 44 in the image store 40 to stitch together a larger image 24 for the target image 20, is displayed on top of the target image 20 on the display 12 of the computing device 2. The conversion possibility information 46 displays the availability for conversion options such as a 180-degree image, 270-degree image, 360-degree image, and 3D 360-image through text 90 or icons 46, allowing a user to visually foresee which conversions are available and select their preferred option. The user may select a conversion option using the selector 48 and request the conversion. The icon 46 may further allow a user to see the conversion process of the target image 20 into the large image 24 with the selected option. The icon 52 may further allow a user to apply a filter on other images 44 based on criteria of time, weather, and historical event via a pop-up window 110A, 110B, and 110C to personalize the larger image 24. Once the target image 20 has been converted to a larger image 24 upon the user's request, the larger image 24 may be displayed on the GUI with an original image navigation information 94, which includes a visual differentiator 100 that that allows a user to visually differentiate the target image and other stitched images in the larger image 24 via a superimposed icon, dashed line, shaded region, or highlighted region. Thus, the user may foresee the available conversions for a target image 20 into a larger image 24, select a desired size and criteria for other images 44, and visually differentiate between the original target image 20 and other images for a more personalized and navigable larger image 24.

Figure 6:
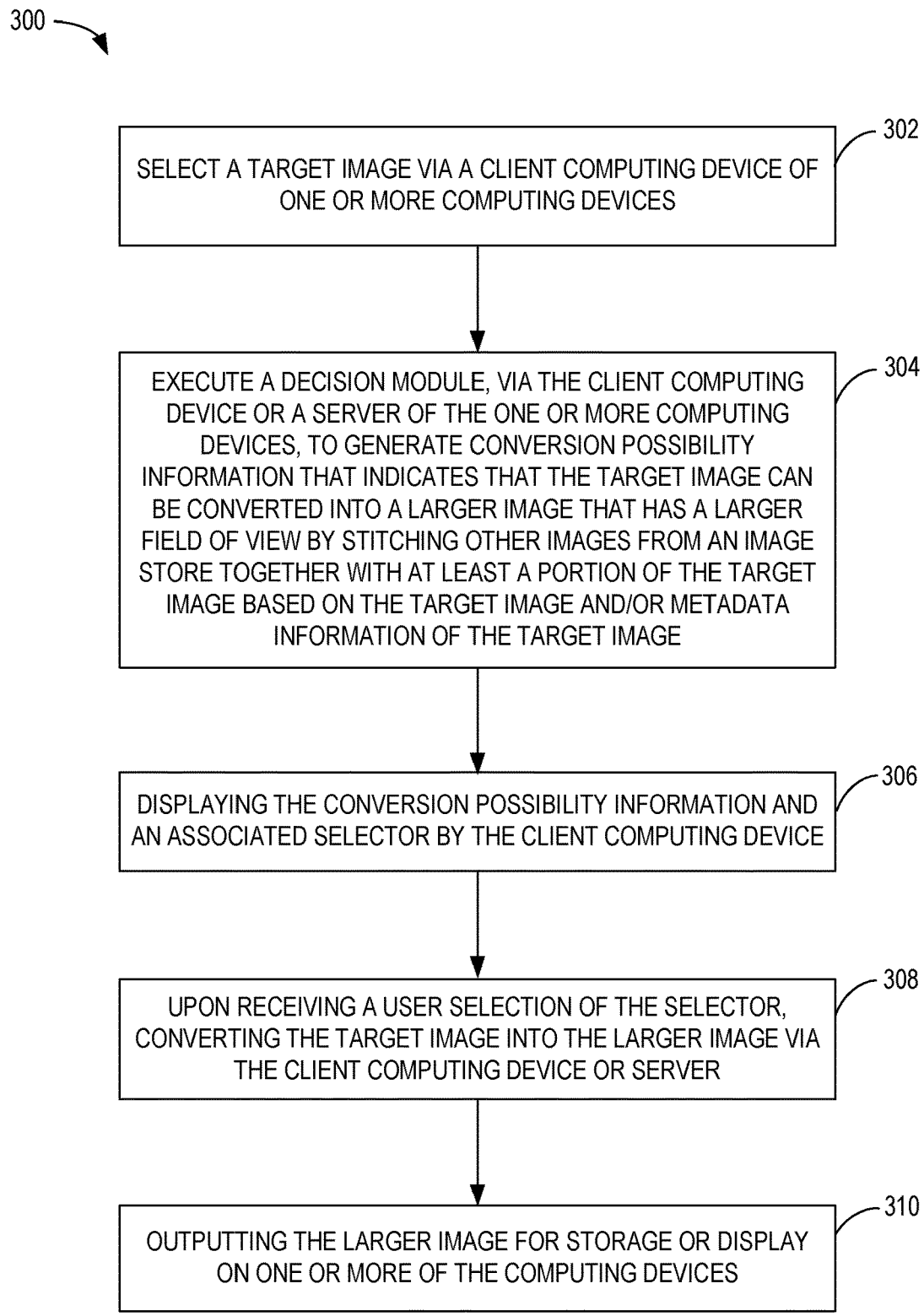
FIG. 6 shows a flowchart of a computerized method according to one example implementation of the present disclosure.

FIG. 6 shows a flowchart of a computerized method 300 according to one example implementation of the present disclosure. At step 302, the method may include selecting a target image via the client computing device or a server of the one or more computing devices. As discussed above, the computing devices 2 may be any of a variety of types of computing devices, such as smartphone, tablet computing device, digital camera, and head mounted display device. At step 304, the method may further include executing a decision module, via the client computing device or a server of the one or more computing devices, to generate conversion possibility information that indicates that the target image can be converted into a larger image that has a larger field of view (e.g., a spherical image or panoramic image) by stitching other images from an image store together with at least a portion of the target image based on the target image and/or metadata information of the target image. As described above, the metadata information may include location information, time information and/or object information associated with the target image. At step 306, the method may further include displaying the conversion possibility information and an associated selector by the client computing device. As discussed above, the conversion possibility information may include an icon that indicates one or more available options for image conversion and icon that indicates image conversion status information. At step 308, the method may further include, upon receiving a user selection of the selector, converting the target image into the larger image. At step 310, the method may further include outputting the larger image for storage or display on one or more of the computing devices. As described above, the larger image may be displayed such that the target image and other stitched images are visually differentiated.

The above-described systems and methods may be utilized to provide a user with advanced knowledge regarding whether a larger image may be generated from images in an image store for a particular target image selected by the user. By programmatically searching for matching images based on a variety of location and content-based factors indicated in metadata for the target image, and returning to the user conversion possibility information, the system can avoid the requirement for uploading several images captured nearly at the same time to a remote stitching service to determine whether they can be stitched together into a larger image, thereby saving significant processing time and bandwidth. Further, the systems and methods described herein provide technical solutions for matching the target image to various other images in an image store based on a variety of location-based and content-based criteria, thereby enabling stitchable images to be matched to the user's target image even when the user's own image library does not such images. Finally, the systems and methods described herein do not require that the other images be captured from the same place and time as the target image, increasing the potential number of available images for stitching.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
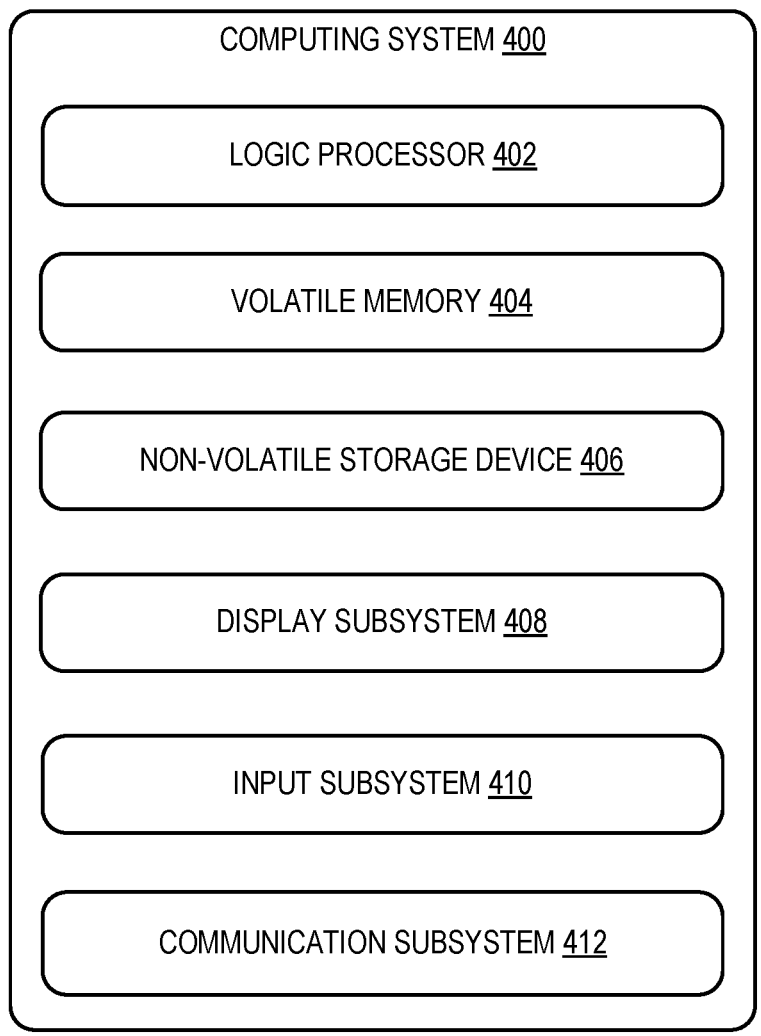
FIG. 7 shows a block diagram of an example computing system that may be utilized to implement the computing system of FIG. 1.

FIG. 7 schematically shows a non-limiting embodiment of a computing system 400 that can enact one or more of the methods and processes described above. Computing system 400 is shown in simplified form. Computing system 400 may embody the computer device 2 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 7.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing device is provided. The computing device may include a storage device configured to store image data. The computing device may further include a processor coupled to a memory that stores instructions, which, upon execution by the processor, cause the processor to select a target image from the image data. The processor may be further configured to display conversion possibility information that indicates that the target image can be converted into a larger image that has a larger field of view by stitching other images together with at least a portion of the target image and an associated selector. The processor may be further configured to display the larger image upon receiving a user selection of the selector.

According to this aspect, the conversion possibility information may be generated based on the target image and/or metadata information of the target image by a decision module of the processor of the computing device.

According to this aspect, the processor may be further configured to transmit the target image and/or metadata information of the target image to a server to cause the server to generate the conversion possibility information. The processor may be further configured to receive the conversion possibility information from the server. The processor may be further configured to receive a user selection of the selector. The processor may be further configured to transmit a larger image request to the server and receive the larger image from the server.

According to this aspect, the metadata information may include location information, time information, orientation information, and/or object information associated with the target image.

According to this aspect, the larger image may be a spherical image or panoramic image.

According to this aspect, the other images may be preselected by an image filter according to filter criteria selected from the group consisting of date, weather, and historical events.

According to this aspect, the conversion possibility information may include an icon that indicates one or more available options for image conversion.

According to this aspect, the conversion possibility information may include an icon that indicates image conversion status information.

According to this aspect, the computing device may be a device selected from the group consisting of smartphone, head mounted display device, tablet computing device, and digital camera.

According to this aspect, the larger image may be displayed with a visual differentiator that visually differentiates the target image and other stitched images in the larger image.

According to another aspect of the present disclosure, a computerized method is provided. The computerized method may include, via one or more processors of one or more computing devices and/or servers, selecting a target image. The computerized method may further include executing a decision module to generate conversion possibility information that indicates that the target image can be converted into a larger image that has a larger field of view by stitching other images from an image store together with at least a portion of the target image. The computerized method may further include displaying the conversion possibility information and an associated selector. The computerized method may further include, upon receiving a user selection of the selector, converting the target image into the larger image. The computerized method may further include outputting the larger image for storage or display on one or more of the computing devices.

According to this aspect, the target image may be selected by a client computing device of the one or more computing devices. The decision module may be executed by the client computing device or a server of the one or more computing devices. The conversion possibility information and an associated selector may be displayed by the client computing device. The target image may be converted into the larger image by the client computer device or server upon receiving a user selection of the selector.

According to this aspect, the conversion possibility information may be generated based on the target image and/or metadata information of the target image.

According to this aspect, the metadata information may include location information, time information, orientation information and/or object information associated with the target image.

According to this aspect, the larger image may be a spherical image or panoramic image.

According to this aspect, the conversion possibility information may include an icon that indicates one or more available options for image conversion.

According to this aspect, the conversion possibility information may include an icon that indicates image conversion status information.

According to this aspect, the computing device may be a device selected from the group consisting of smartphone, head mounted display device, tablet computing device, and digital camera.

According to this aspect, the larger image may be displayed such that the target image and other stitched images are visually differentiated.

According to another aspect of the present disclosure, a computing device may include a storage device configured to store image data. The computing device may further include a processor coupled to a memory that stores instructions, which, upon execution by the processor, cause the processor to detect a target image from the image data. The processor may be further configured to detect a target image from the image data. The processor may be further configured to transmit the target image or the metadata information of the target image to a server to generate conversion possibility information that indicates that the target image can be converted into a larger image that has a larger field of view by stitching other images together with at least a portion of the target image. The processor may be further configured to receive the conversion possibility information from the server. The processor may be further configured to display the conversion possibility information and an associated selector. The processor may be further configured to programmatically select a target image. The processor may be further configured to send a request to the server to convert the target image into the larger image. The processor may be further configured to receive the larger image from the server and display the larger image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a storage device configured to store image data;
   a processor coupled to a memory that stores instructions, which, upon execution by the processor, cause the processor to:
   select a target image from the image data, wherein the target image includes a region of interest;
   display conversion possibility information with an associated selector, the conversion possibility information indicating that the target image can be converted into a stitched image that has a larger field of view than the target image by stitching other images together with at least an original portion of the target image that captures the region of interest, wherein the other images are selected according to criteria comprising at least one of date, weather, or a historical event; and
   display the stitched image upon receiving a user selection of the associated selector.

2. The computing device of claim 1, wherein the conversion possibility information is generated based on metadata information of the target image.

3. The computing device of claim 2, wherein the metadata information includes at least one of location information associated with the target image, time information associated with the target image, orientation information associated with the target image, or object information associated with the target image.

4. The computing device of claim 1, wherein the processor is further configured to:
   transmit the target image and metadata information of the target image to a server to cause the server to generate the conversion possibility information;
   receive the conversion possibility information from the server;
   receive a user selection of the associated selector;
   transmit a stitched image request to the server; and
   receive the stitched image from the server.

5. The computing device of claim 1, wherein the stitched image is a spherical image or a panoramic image.

6. The computing device of claim 1, wherein the conversion possibility information includes an icon that indicates one or more available options for image conversion.

7. The computing device of claim 1, wherein the conversion possibility information includes an icon that indicates image conversion status information.

8. The computing device of claim 1, wherein the computing device is a device one of a smartphone, a head mounted display device, a tablet computing device, or a digital camera.

9. The computing device of claim 1, wherein the stitched image is displayed with a visual differentiator that visually differentiates the original portion of the target image from the other images.

10. A computerized method implemented via one or more processors of one or more computing devices or servers, the method comprising:
    selecting a target image;
    generating conversion possibility information that indicates that the target image can be converted into a stitched image that has a larger field of view than the target image by stitching other images together with at least an original portion of the target image, wherein the other images are selected according to criteria comprising at least one of date, weather, or a historical event;
    causing the conversion possibility information and an associated selector to be displayed;
    upon receiving an indication of a user selection of the associated selector, converting the target image into the stitched image; and
    causing the stitched image to be at least one of stored or displayed.

11. The computerized method of claim 10, wherein
    the target image is selected by a client computing device of the one or more computing devices; and
    the conversion possibility information and the associated selector are displayed by the client computing device.

12. The computerized method of claim 10, wherein the conversion possibility information is generated based on metadata information of the target image.

13. The computerized method of claim 12, wherein the metadata information includes at least one of location information associated with the target image, time information associated with the target image, orientation information associated with the target image, or object information associated with the target image.

14. The computerized method of claim 10, wherein the stitched image is a spherical image or a panoramic image.

15. The computerized method of claim 10, wherein the conversion possibility information includes an icon that indicates one or more available options for image conversion.

16. The computerized method of claim 10, wherein the conversion possibility information includes an icon that indicates image conversion status information.

17. The computerized method of claim 10, wherein the computing device is one of a smartphone, a head mounted display device, a tablet computing device, or a digital camera.

18. The computerized method of claim 10, wherein the stitched image is displayed such that the original portion of the target image is visually differentiated from the other images.

19. A computing device, comprising:
    a storage device configured to store image data;
    a processor coupled to a memory that stores instructions, which, upon execution by the processor, cause the processor to:
    select a target image from the image data;
    display conversion possibility information with an associated selector, wherein:

the conversion possibility information indicates that the target image can be converted into a stitched image that has a larger field of view than the target image by stitching other images together with at least a portion of the target image; and the other images are preselected by an image filter according to filter criteria comprising at least one of a date, weather, or a historical event; and display the stitched image upon receiving a user selection of the associated selector.

\* \* \* \* \*